May 6, 1958   C. L. CALLUM ET AL   2,833,206
BALING MACHINE
Filed Sept. 26, 1955   2 Sheets-Sheet 2

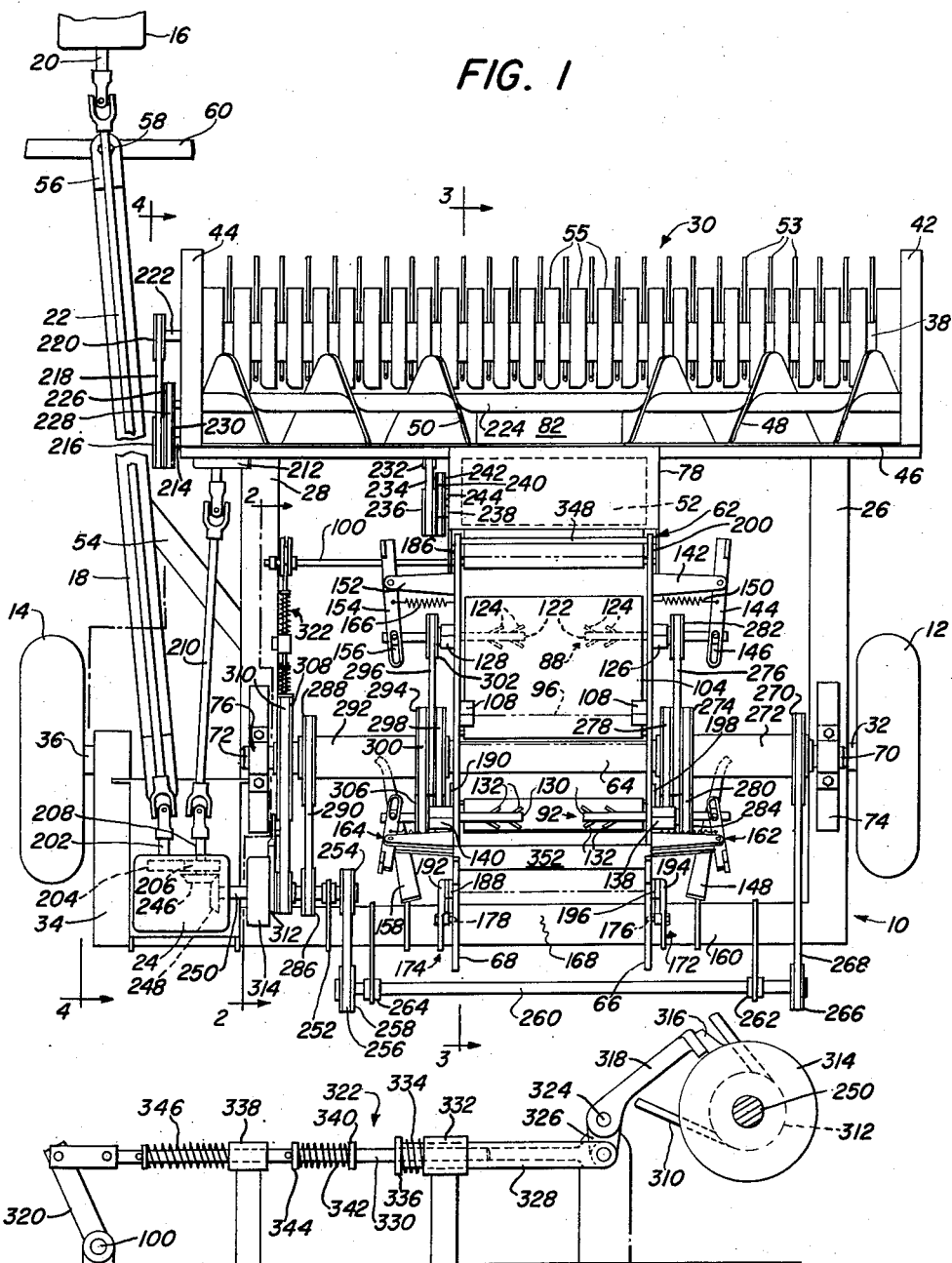

INVENTORS
G. SOTEROPULOS &
C. L. CALLUM

United States Patent Office 2,833,206
Patented May 6, 1958

2,833,206
BALING MACHINE

Charles L. Callum and Gust Soteropulos, Ottumwa, Iowa, assignors to Deere Manufacturing Co., Dubuque, Iowa, a corporation of Iowa Application September 26, 1955, Serial No. 536,469

7 Claims. (Cl. 100—79)

This invention relates to a baler and more particularly to a baler for baling material in the form of cylindrical bales.

The invention has for a principal object the provision of an improved machine for forming cylindrical bales of relatively light weight so that they can be easily handled. The invention features further the improvement in mobile balers of the type used for harvesting and picking up agricultural crops for the formation of such crops into successive bales. The invention is primarily characterized by the mounting on a suitable frame of rotatable means carrying a plurality of spindle elements, on each of which bales are successively formed and discharged, the construction including means for moving the rotatable means in angular increments equal to the number of spindle means so that successive spindle means or elements are presented in succession to a material-feeding station. As the material is wound or accumulated on a spindle element presented to the feeding station, the bale is formed and when the bale reaches a predetermined size, the rotatable means is moved angularly to cause the loaded spindle element to depart from the feeding station for discharge, while the next spindle element moves to the feeding station.

The foregoing and other important objects and desirable features inherent in and encompassed by the invention will become apparent as a preferred embodiment thereof is disclosed in detail in the ensuing specification and accompanying sheets of drawings, the several figures of which will be described immediately below.

Fig. 1 is a plan view of the improved machine.

Fig. 2 is a fragmentary sectional view of the clutch control means, on an enlarged scale, as seen substantially along the line 2—2 of Fig. 1.

Figure 3:
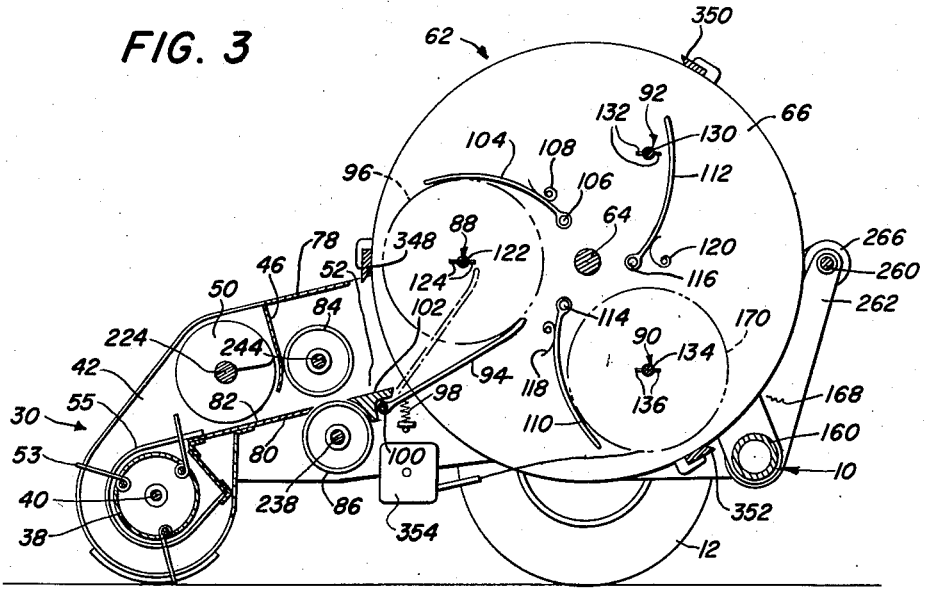
Fig. 3 is a sectional view on the line 3—3 of Fig. 1.

The various features of the invention have been incorporated in a suitable machine for propulsion by a tractor or other draft vehicle. For this purpose, the frame of the machine, designated generally by the number 10, is rendered mobile by the provision of right and left hand wheels 12 and 14. Provision for connecting the frame to a tractor or the like, a portion of which is visible at 16, is accomplished by means of a forwardly extending draft tongue 18. The propelling tractor has a conventional rearwardly extending power take-off shaft 20 and a propeller shaft 22, connected to the power take-off shaft, furnishes drive to a frame-supported gear box 24.

The main frame includes right and left hand forwardly extending side members 26 and 28 for supporting at a forward portion of the frame crop-collecting or pick-up means designated in its entirety by the numeral 30. The right hand wheel 12 is journaled on a short axle 32 that is carried by the right hand forwardly extending frame member 26. An extension cranked support 34 has a short axle 36 on which the left hand wheel 14 is journaled.

The pick-up means 30 may embody conventional design and to that end includes a transversely elongated pick-up drum 38 carried on a transverse shaft 40 which is supported at its opposite ends respectively in right and left hand end walls 42 and 44 of the pick-up means, which means has a transverse substantially upright rear wall 46 across which a feeder, in the form of right and left hand augers 48 and 50, operates to receive crops from the pick-up drum 38 and to feed the crops inwardly to a feeding station 52. The drum 38 is conventionally equipped with pick-up fingers 53 which are respectively interspaced with fixed strippers 55 and are operative to pick up from the ground previously harvested crops and to deliver such crops rearwardly to the augers 48 and 50 for ultimate delivery to the feeding station 52.

The left hand side member 28 of the frame 10 includes a diagonal brace 54 for bracing the draft tongue 18. The forward end of this tongue has a clevis 56 which is pivotally connected at 58 to the drawbar 60 of the tractor 16.

The bale forming part of the machine is located rearwardly of the feeding station 52 and intermediate the right and left hand side frame members 26 and 28. This part comprises rotatable means in the form of what may be termed a drum 62 made up of a central shaft 64 and a pair of upright circular end walls 66 and 68. The axis of the shaft 64 is transverse to the line of advance of the machine and right and left hand ends of this shaft are reduced, as at 70 and 72 respectively, and these end portions are respectively journaled in upright supports 74 and 76 that rise respectively from the right and left hand frame members 26 and 28. The mounting of the rotatable means or drum 62 via the shaft 64 and supports or bearings 74 and 76 arranges the drum for rotation or angular movement about the axis of the shaft. The transverse spacing between the drum end walls 66 and 68 is substantially equal to the width of the means that defines the feeding station 52, which means comprises a housing 78 located centrally and rearwardly of the pick-up means 30 and having a floor 80 which is in effect a rearward continuation of a floor portion 82 between the delivery ends of the augers 48 and 50. In other words, the feeding station 52 is substantially in radial register with the space between the walls 66 and 68 of the drum and in this zone the housing 78 carries upper and lower feed rolls 84 and 86 respectively above and below the plane of the floor 80. For this reason, crops fed through the feeding station 52, because of the combined action of the augers 48 and 50 and feed rolls 84 and 86, enter the drum 62.

The end walls of the drum carry a plurality of spindle forming elements, here three in number and designated by the numerals 88, 90 and 92, uniformly angularly spaced upon individual axes about and parallel to the drum shaft 64. In the present instance, the angular spacing between the spindle elements is, of course, 120°. Each spindle element is radially spaced from the shaft 64 and is radially spaced inwardly from the peripheries of the drum end walls 66 and 68. The drum has a starting or initial position in which the spindle element 88, for example, is presented to the feeding station 52. Crops fed into the drum from the feed rolls 84 and 86 pass over a hinged floor 94 and are caused to wrap around the spindle element to form a cylindrical rolled bale, the general outline of a bale on the spindle element 88 being indicated by a dot-dash circle labeled 96. The floor 94 is biased by a compression spring 98 to the starting position shown in dotted lines in Fig. 3 and is hinged at 100 on a transverse axis to a fixed or shear bar 102 that forms a rearward floor extension behind the lower feed roll 86. A hinged plate 104, pivoted at 106 and spring loaded by a small torsion spring 108, contributes to the formation of the bale as the material is wrapped around the spindle element 88. Similar hinged plates 110 and 112 are associated respectively with the other spindle elements 90 and 92. These plates are hinged respectively at 114 and 116 and are spring loaded respectively at 118 and 120.

The ability of each spindle element to form a bale is occasioned by the construction of each such element. For example, the element 88 comprises a pair of coaxial bale-winding spindles 122, each of which is barbed at 124. Each spindle 122 is rotatable as well as axially slidable in its proximate drum end wall. For example, the right hand spindle 122 is journaled and axially slidable in an appropriate bearing 126 in the right hand wall 66 and the coaxial spindle 122 is similarly mounted at 128 in the left hand drum wall 68. The spindle element 92 similarly has coaxial spindles 130 which have radially outwardly and axially inwardly projecting barbs 132. The identical nature of the spindle element 90 is not completely visible, but in Fig. 3 can be seen one of the spindles 134 and the barbs 136 thereon. Right and left hand bearings 138 and 140 respectively carry the spindles 130 for rotation and for axial movement. Similar bearings, not shown, carry the spindles 134 for the spindle element 90.

The arrangement of the coaxial spindles for each spindle element is such that when the spindles are axially withdrawn in opposite directions, the wound bale thereon is freed for discharge. For this purpose, the end wall 66 of the drum carries thereon an outwardly extending support 142 on which is pivotally mounted a control arm 144. This arm is connected at one end to the outer end of the associated spindle 122, as at 146, and has its other end engageable by a fixed cam 148 during a certain stage of angular movement of the rotatable means or drum. A spring 150 biases the arm 144 to the position shown in Fig. 1. Similar structure is arranged on the opposite end wall 68 for the other spindle 122 and includes a support 152, an arm 154 connected to the proximate shaft 122 at 156 and having its other end engageable with a cam 158, it being understood that this cam, like the cam 148, is rigidly fixed to a transverse rear portion 160 of the main frame 10. The other spindle elements have similar control arms and since these are identical to those previously described, they will be identified generally as right and left hand arms 162 and 164, it being understood that the details are the same as those described in connection wtih the structure 142—146. A spring 166 biases the arm 154 and consequently the other spindle 122 to the position shown in Fig. 1, wherein it will be seen that the proximate inner ends of the spindles are relatively closely spaced apart axially. It will be clear that when the drum rotates sufficiently to cause engagement between the free ends of the arms 144 and 154 and the cams 148 and 158, respectively, the spindles 122 will be withdrawn in axially opposite directions to clear the end walls 66 and 68 so that the material wound thereon in bale form will be free for discharge at what may be termed a bale-discharge station 168 at the rear of the machine. The inclination of the barbs on these spindles contributes to the ease with which the spindles are withdrawn. After the control arms pass the cams, the return springs restore the spindles to their original positions.

As the bale 96, for example, is formed on the spindle element 88, it gradually accumulates to such size as to cause displacement of the hinged floor 94 to a position approximately that shown in Fig. 3. As will be brought out below, this actuates control mechanism for causing the drum to move through an angular increment of 120°. As the drum so moves, the spindle element 88 will occupy the position of the spindle element 90 and the unloaded spindle element 92 will be presented to the feeding station 52. Before the spindle element 90 occupies the position of the spindle element 92, the cams 148 and 158 will cause the spindles 134 to be withdrawn from the bale 170 so that this bale is discharged over the transverse frame member 160 through the discharge zone 168.

Figure 4:
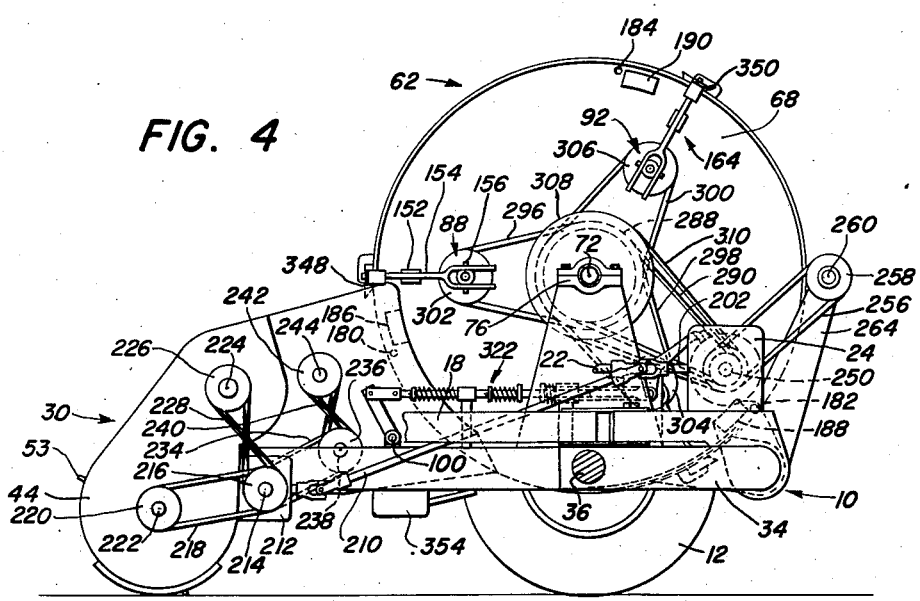
Fig. 4 is a view of the machine, partly in section, as seen along the line 4—4 of Fig. 1.

In order that the drum 62 may be releasably held in any one of its three positions, the rear frame member 160 carries right and left hand combination detent means and brake means 172 and 174, respectively. The detent means 172 has a plunger 176 which is selectively engageable with any one of three holes (not shown) in the side of the end 66 of the drum, which holes are spaced angularly on the order of the spindle elements. Similar holes for engagement by the plunger 178 of the left hand means 174 are visible in the left hand wall 68 in Fig. 4 and are numbered 180, 182 and 184. Brake pads 186, 188 and 190, respectively proximate the plunger-receiving holes 180, 182 and 184 are also visible on the left hand wall 68 (Fig. 3) and cooperate with a left hand brake shoe 192 in the left hand means 174. A right hand brake shoe 194 cooperates with similar brake pads on the right hand wall 66 of the drums, one of those pads being visible at 196 in Fig. 1. The other two brake pads on the right hand drum end wall 66 are barely visible at 198 and 200. Since the drum 62 must occupy any one of its angular positions long enough for the material to be accumulated on the presented spindle element, the means 172 and 174 constitute releasable locking means, combining retarding means, for accomplishing this purpose. As will be brought out below, the drum moves angularly in increments of 120°. The drive for the drum, when engaged, overcomes the detent and the associated brake pad moves angularly away from its associated shoe. As the drum nears the end of its 120° movement, the drive disengages and the drum "coasts" slightly until it is caught and retained by the brake and detent means.

As previously described, the power take-off shaft-driven propeller shaft 22 provides power input for the gear box 24. This it does by means of a first forwardly extending shaft 202. This shaft has keyed thereto within the gear box 24 a gear 204 which is in constant mesh with a gear 206 keyed to the rear end of a second forwardly extending shaft 208. A driving shaft 210 extends forwardly from the shaft 208 and is connected to a gear box 212 at the left hand rear corner of the pick-up means 30. A transverse shaft 214 extends from the gear box 212 and has thereon an outer sheave 216 which, by means of a belt 218, drives a sheave 220 that is keyed to the outer end of a pick-up drive shaft 222, which shaft is a continuation of the pick-up drum shaft 40. The augers 48 are coaxially mounted on a transverse shaft 224 which has keyed to its left hand end a sheave 226. A crossed belt 228 connects the sheave 226 to an inner or second sheave 230 on the gear box shaft 214.

The shaft 214 from the gear box 212 extends to the right (not shown) and has keyed thereto a sheave 232 (Fig. 1) which is belted to one groove of a double-grooved sheave 236 on the lower feed roll shaft 238. The other groove of the sheave 236 is belted at 240 to a sheave 242 keyed to the upper feed roll shaft 244.

The gear box gear 206 has fixed thereto a bevel pinion 246 which is in constant mesh with and drives a bevel pinion 248 that is keyed to the inner end of a transverse shaft 250. This shaft extends to the right of the gear box and is journaled in a suitable bearing at 252 on the rear main frame member 160. To the extreme right hand end of the shaft 250 is keyed a sheave 254 which is belted at 256 to a sheave 258 keyed to the left hand end of a transverse counter shaft 260, which shaft is appropriately journaled in right and left hand bearings 262 and 264 on the rear frame member 160. A sheave 266, keyed to the extreme right hand end of the counter shaft 260, drives, via a belt 268, a sheave 270 that is keyed to the right hand end of a sleeve 272 journaled on that portion of the drum shaft 64 between the drum end wall 66 and the right hand drum shaft bearing 74. The inner end of the sleeve 72 has keyed thereto a triple sheave 274 about which are trained three belts 276, 278 and 280, these belts being respectively trained about smaller sheaves on the right hand spindles of the spindle elements. In Fig. 1, only the sheaves 282 and 284 for the spindle elements 88 and 92 are visible. Since the sleeve 72, together with its sheave 270 and triple sheave 274, is journaled on the drum shaft 64, the sleeve and sheaves can rotate regardless of whether the drum is moving or is stationary. In other words, the spindle elements 88, 90 and 92 are constantly driven.

A corresponding drive is provided for the other spindles of the spindle elements. For this purpose, the shaft 250 from the gear box 24 has an intermediate sheave 286 belted to a single sheave 288, by a belt 290, which sheave 288 is keyed to a sleeve 292 that is journaled on that portion of the drum shaft 64 between the drum left hand end wall 68 and the left hand bearing 76. A triple sheave 294, keyed to the right hand end of the sleeve 292, drives three belts 296, 298 and 300 for the spindle elements 88, 90 and 92 respectively. The belt 296 is trained about a sheave 302 on the left hand spindle 122 of the spindle element 88. The belt 298 is trained about a sheave 304 (Fig. 4) for the left hand spindle 134 of the spindle element 90. The belt 300 is trained about a small sheave 306 for the left hand spindle 130 of the spindle element 92. The arrangement of the sheaves is such that the spindles of the spindle elements are driven at uniform speeds and, like the right hand spindles, are driven constantly regardless of whether the drum is moving or fixed.

The drum shaft 64 has keyed thereto, just to the right of the left hand bearing or support 76, a drive sheave 308 which is connected by a belt 310 to a driving sheave 312 that is journaled on the shaft 250 as part of a one-revolution clutch including a constantly rotating part 314 keyed to the shaft 250. The one-revolution clutch is of a conventional construction, such as that shown, for example, in the U. S. patent to Tuft 2,512,754 granted June 27, 1950. This clutch includes a clutch dog 316 held by a control member 318 in such manner as to cause disengagement between the driving part 314 and the driven sheave 312. Hence, the drum is maintained stationary because no drive is transmitted by the clutch, except at predetermined intervals controlled by the hinged floor 94, in a manner to be presently described.

The hinged floor was previously described as being mounted on a pivot 100. This pivot 100 comprises a transverse shaft to the left hand or outer end of which is fixed an upstanding arm 320. This arm is connected by linkage, designated in its entirety by the numeral 322, to a rockshaft 324 on which the clutch control member 318 is fixed. The rockshaft has a depending arm 326 to which the linkage is connected. The arrangement is such that when the bale being wound, for example, on the spindle element 88, reaches a predetermined size, the floor 94 is displaced downwardly. This causes clockwise rocking of the rockshaft 100 which, through the linkage 322, causes counterclockwise rocking of the control rockshaft 324, swinging the control member 318 out of the path of the clutch dog 316. As is conventional, this clutch dog is biased to a position in which it engages the parts 312 and 314, thereby imparting drive to the drum to cause the drum to move through an angular increment, here 120°. The ratio between the sheaves 312 and 308 is such that one revolution of the sheave 312 is one-third of a revolution of the drum 62. Consequently, when the bale is formed on the spindle element 88, the control just described constitutes means responsive to the attainment by that bale of a predetermined size for causing the drum to move to a new position in which the next spindle element, here 92, is presented to the feeding station 52 and the now loaded spindle element 88 will move to the position of the spindle element 90 for subsequent discharge of the bale 96 as the spindles 122 are axially withdrawn by the control means 144—148 and 154—158.

The linkage 322 is so designed as to accommodate the entire movement of the floor 94, because this floor will move not only to the position of Fig. 3 but must clear the bale as the drum rotates. For this reason, the arm 326 on the rockshaft 324 is connected to a tube 328 in which a rod 330 is slidable. The tube 328 is slidable in a bearing 332 and is normally biased forwardly by a relatively weak spring 334, which spring is confined between the bearing 332 and a stop 336 fixed to the front end of the tube. The rod 330 extends forwardly to a pivotal connection with the arm 320 on the floor shaft 100, being guided by an appropriate bearing 338. During initial movement of the floor 94 as the bale 96 accumulates, the rockshaft or floorshaft 100 turns in a clockwise direction without affecting the clutch 312—314, because the rod 330 is allowed to telescope into the tube 328 until a stop 340 on the rod engages the abutment 336 at the front of the tube. The stop 340 on the rod is backed up by a still stronger spring 342 which reacts against a fixed stop 344 on the rod. When the bale 96 attains its predetermined size, the stop 340 is in engagement with the abutment 336 and further movement fails to compress the spring 342 but does compress the spring 334, with the result that the tube 328 is shifted sufficiently to rock the rockshaft 324 in a counterclockwise direction to clear the arm 318 from the clutch dog 316. This sets into operation the drive for moving the drum one-third of a revolution. As the drum moves, the bale 96 continues to exert force on the floor 94, swinging the floor still further in a clockwise direction. The spring 334 at this point is fairly solidly compressed between the bearing 332 and the stop 336 and the tube 328 can no longer move. However, at this point, the spring 342 can compress to accommodate the excess rocking of the floorshaft 100. A third spring 346 acts on the rod 330 to restore the arm 320 and floorshaft 100 to its normal position, assisted by the spring 98 behind the floor, as the bale 96 clears the floor.

Another feature of the invention resides in the means for severing the material between the feeding station and the completely wound bale. Part of this means comprises the previously described shear bar 102. The co-operating parts of this means include drum-mounted knives 348, 350 and 352. Each knife extends completely across the drum and is appropriately carried at its opposite ends by the opposite end walls 66 and 68 of the drum. As will be clear from Fig. 3, after the bale 96 is formed and the drum is caused to move to a new position, the knife 348 passes in shearing relation to the shear bar 102 and severs the material between the feeding station and the completed bale. In this respect, it should be understood that the material will be fed through the feeding station by the feed rolls 84 and 86 in the form of a mat. The completed bales may rely upon their own adhesion to retain their form. Or, they may be tied by any suitable tying mechanism, one form of which is designated here generally by the numeral 354. No details of this mechanism are disclosed, since it may take any suitable form such as that shown in the U. S. patent to Luebben 2,336,491 granted December 14, 1943.

Operation

The machine is here shown as a mobile type adapted to operate over a field in which crops have been previously harvested and left lying on the ground in windrows. As the machine is advanced, under power of a tractor or other source, the pick-up or crop-collecting means 30 operates to pick up the crops, to elevate them to the floor 82, and the augers 48 and 50 operate to compress the crops laterally into a mat or stream which passes through the feed rolls 84 and 86 and over the floor 80 through the feeding station 52 and up the floor 94 to be engaged by the barbs on the spindle element 88, for example. The clutch 312—314 is disengaged and the position of the drum is maintained by the releasable means at 172 and 174. The spindle elements are constantly driven. As the spindle element 88 rotates, it wraps the material thereabout and forms the bale 96. Grasping of the mat of material by the barbs 124 is readily understandable because the floor 94, when in the dotted line position of Fig. 3, guides the material up to the zone of the barbs. As the bale 96 accumulates, the floor 94 moves downwardly, but this motion has no effect on the clutch 312—314, because of the linkage 322. However, when the bale 96 attains the size shown in Fig. 3, the floor 94 causes rocking of the rockshaft 100 in the manner previously described which completes its action through the linkage 322 to trip the clutch 312—314 and set into motion the drive to the drum 62, whereupon the previously formed bale 170 is discharged through the discharge zone or station 168 as the drum advances and causes the control means or cams 148 and 158 to withdraw the spindles 134. At the same time, the bale just formed (that is, the bale 96) will move to the position of the previous bale 170, the spindle element 92 will move into the position previously occupied by the spindle element 88 and the spindle element 90 will move into the position previously occupied by the spindle 92. Thereafter, the same sequence of operations is continued. During the formation of a bale on the now presented spindle element 92, the clutch will have been disengaged and the drum will again be idle, being retained by the brake and detent means 172 and 174 as explained before.

Summary

The machine embodying the preferred form of the principles of the invention is of relatively simple construction and its primary purpose is to form cylindrical bales of relatively small size that may be easily handled and fed to animals. The invention involves, in addition to those features categorically enumerated herein, other features that will undoubtedly occur to those versed in the art, as will various modifications and alterations in the construction illustrated, all of which may be achieved without departing from the spirit and scope of the invention.

What is claimed is:

1. A baler, comprising: a main frame; means on the main frame providing a feeding station operative to feed material along a defined feeding path; a drum structure carried by the frame to turn about an axis transverse to said path and having spaced apart radial walls; a plurality of rotatable spindle means carried by the drum between the walls thereof and in angularly spaced relation about the drum axis, each spindle means including a pair of spindle elements coaxial on an axis parallel to the drum axis and journaled and axially slidably carried by opposed portions of the walls, respectively, for axial inward movement normally toward each other and for axial movement oppositely outwardly; intermittently operative drum-driving means for turning the drum to present one spindle means to the feeding station so that the presented spindle means, with its elements moved axially inwardly, receives material from said station and wraps said material on said presented elements to form a rolled bale; means operative in response to a predetermined accumulation of material on the presented spindle means to cause the drum-driving means to turn the drum and thus to remove the aforesaid presented spindle means and the bale carried thereby to a position remote from the feeding station and to present a second spindle means to said station; and spindle withdrawing means operative upon turning of the drum for moving the elements of the bale-carrying spindle means axially oppositely outwardly to withdraw said elements from the bale so as to free said bale from said elements.

2. The invention defined in claim 1, in which: the spindle-withdrawing means includes a plurality of pairs of actuating members, one pair for each spindle means, movably carried by the drum walls for incurring the aforesaid inward and outward movement of the respective elements, and cams on the frame respectively at opposite sides of the drum arranged to engage the members of the bale-carrying spindle means as the drum turns.

3. The invention defined in claim 1, including: releasable lock means engageable to retain the drum temporarily against turning while a bale is being formed on the presented spindle means, said lock means being releasable upon actuation of said drum driving means in response to a predetermined accumulation of material on the presented spindle means, and reengageable when the next spindle means is presented; and brake means in addition to the lock means and operative to retard the drum just prior to reengagement of said lock means.

4. A baler, comprising: a main frame; means on the main frame providing a feeding station operative to feed material along a defined feeding path; support means movable on the frame from a first position adjacent to and a second position remote from said station, said support means including a pair of support portions spaced apart crosswise of said path; spindle means disposed crosswise of said path and carried by said portions for rotation to receive material from said station and to wrap said material into a rolled bale, said spindle means including a pair of spindle elements coaxial on an axis crosswise of said path and journaled and axially slidably carried by the support portions, respectively, for axial inward movement normally toward each other to assume a bale-forming status in which said rolled bale is formed and for axial movement oppositely outwardly to assume a bale-discharge status in which said elements are withdrawn from the bale; means operative in response to a predetermined accumulation of material on the spindle means for moving the support from its first position to its second position; and element-withdrawing means, operative upon movement of the support means to said second position for withdrawing said elements from the bale to free the bale for discharge.

5. The invention defined in claim 4, in which: the element-withdrawing means includes actuating members movable respectively on the support portions and connected respectively to the spindle elements for incurring inward and outward axial movement of said elements, means biasing the members to produce inward axial movement of said elements, and cams on the frame respectively in the paths of said members defined as the support means moves to its second position, said cams respectively engaging said members to incur withdrawal of said elements.

6. A baler, comprising: a main frame; means on the main frame providing a feeding station operative to feed material along a defined feeding path; support means movable on the frame from a first position adjacent to and a second position remote from said station, said support means including a support portion alongside said path; spindle means journalled by and axially slidable in said portion to project normally across said path to receive material from said station and to wrap said material into a rolled bale, said spindle means being axially outwardly retractable through said portion for withdrawal from the bale; means operative in response to a predetermined accumulation of material on the spindle means for moving the support from its first position to its second position; and spindle withdrawing means operative upon movement of the support means to said second position for withdrawing said spindle means from the bale to free the bale for discharge.

7. The invention defined in claim 6, in which: the spindle-withdrawing means includes an actuating member movable on the support portion and connected to the spindle means for incurring inward and outward axial movement of said spindle means, means biasing the member to produce inward axial movement of said spindle means, and a cam on the frame in the path of said member as the support means moves to its second position, said cam engaging said member to incur withdrawal of said spindle means.

References Cited in the file of this patent

UNITED STATES PATENTS

| | | |
|---|---|---|
| 750,672 | Luebben | Jan. 26, 1904 |
| 2,336,491 | Luebben | Dec. 14, 1943 |
| 2,469,580 | Scranton | May 10, 1949 |
| 2,627,714 | Freeman et al. | Feb. 10, 1953 |

FOREIGN PATENTS

| | | |
|---|---|---|
| 495,413 | Canada | Aug. 18, 1953 |